Figure 1:
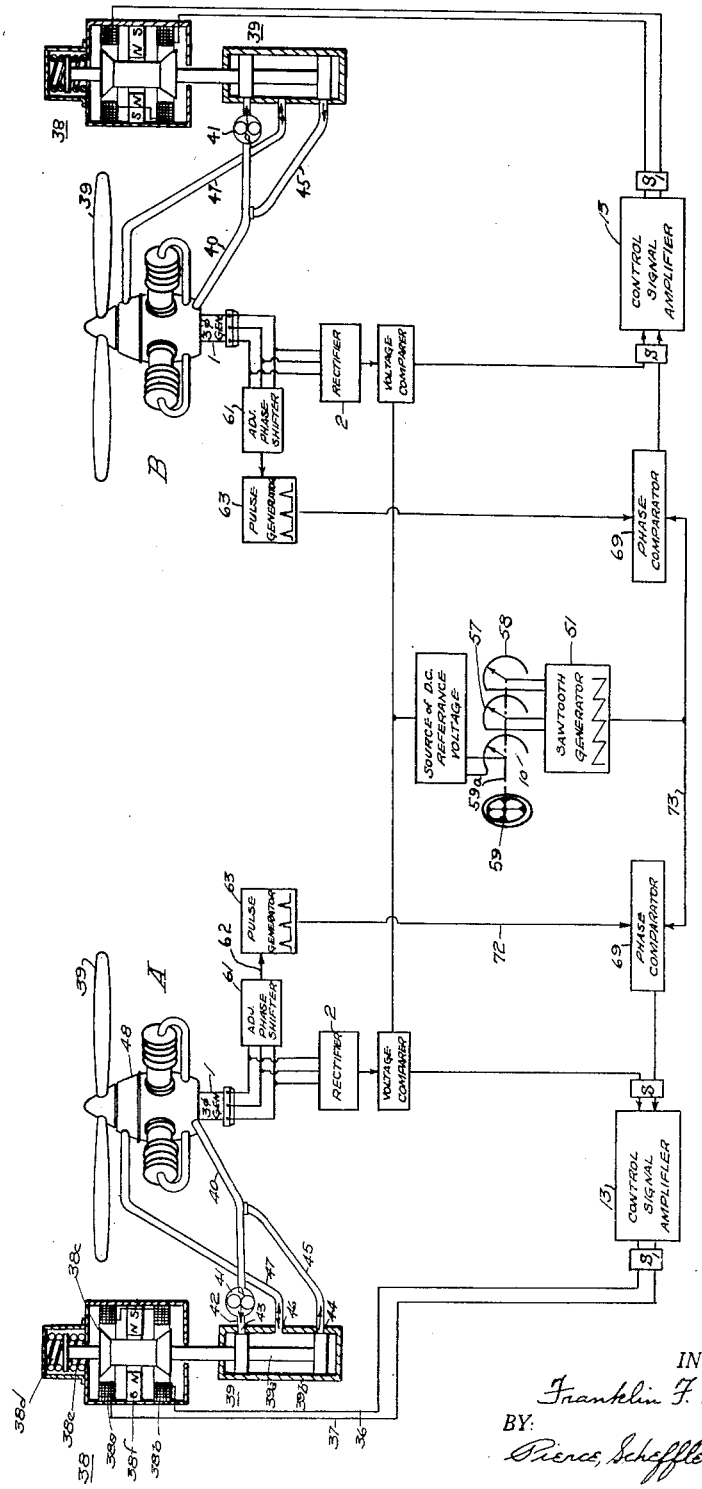

Aug. 8, 1950  F. F. OFFNER  2,517,703
SYNCHRONIZING APPARATUS
Filed July 25, 1947  4 Sheets-Sheet 1

INVENTOR.
Franklin F. Offner,
BY:
Pierce, Scheffler & Parker,
Attorneys.

Patented Aug. 8, 1950

2,517,703

UNITED STATES PATENT OFFICE 2,517,703

SYNCHRONIZING APPARATUS

Franklin F. Offner, Chicago, Ill.

Application July 25, 1947, Serial No. 763,542

32 Claims. (Cl. 318—45)

This invention relates to governor apparatus for rotating bodies such as engines, turbines, dynamoelectric machinery and other types of power plants and rotating members and more particularly to an improved electrical governor of the automatically rebalancing null-signal type for controlling both the speed and phase of one or more rotating members.

Although the invention is considered to be of general utility, it is particularly useful in aircraft for synchronizing a plurality of engines each driving one or more variable pitch propellers, in which the speed of the engine and the propeller is controlled by varying the propeller pitch. While it is accordingly with respect to the latter application that the invention is herein illustrated and described, it will be understood that the invention is not so limited but is deemed to also include such modifications and uses as come within the scope of the invention as expressed in the appended claims.

One object of the invention is to provide an electrical governor system which regulates the speed of each of a plurality of rotating members in accordance with adjustable electrical quantities employed as reference standards.

Another object is to provide an electrical governor system for regulating the respective speeds of a plurality of associated rotating members in such manner as to maintain all of the members at the same speed and also in the same or some other predetermined phase relationship selected by the operator.

A more specific object is to provide an electrical synchronizing system of the null type for multiple type power plant installations wherein the respective phases of all the power plants are regulated simultaneously by a signal derived by continuous comparison between an electrical wave produced by each plant and a locally generated "master" wave of a selected frequency. Another object is to provide for selectively shifting the phase of the wave produced by one or more of the power plants relative to that of the "master" reference wave so as to change the phase relationship as between two or more of the power plants.

Another specific object is to provide an electrical speed and phase synchronizing system of the null type for a power plant; the speed is controlled primarily by a "speed governor" section which produces a change-speed signal whose polarity and amplitude are determined, respectively, by the sense and magnitude of the difference between (1) a voltage variable with the speed of the power plant and (2) an adjustable reference voltage; and the phase is controlled by a "phase governor" section which produces a change-speed signal whose polarity and amplitude are determined respectively, by the sense and magnitude of the deviation in phase between (1) a voltage wave indicative of the phase of the power plant and (2) a reference voltage wave whose repetition rate is adjustable.

Another object is to provide a new and improved device for obtaining the phase relationship between an electrical wave having a repetition rate subject to variation and another electrical wave whose repetition rate can be adjusted to a selected constant value.

Yet another object is to provide an improved circuit of the feed-back type for stabilizing the operation of an electrical control system of the automatically self-balancing type.

Still another object is to provide an improved electronic saw-tooth generator for maintaining the amplitude of the saw-tooth wave constant irrespective of changes in the frequency at which it is operated.

Figure 2:
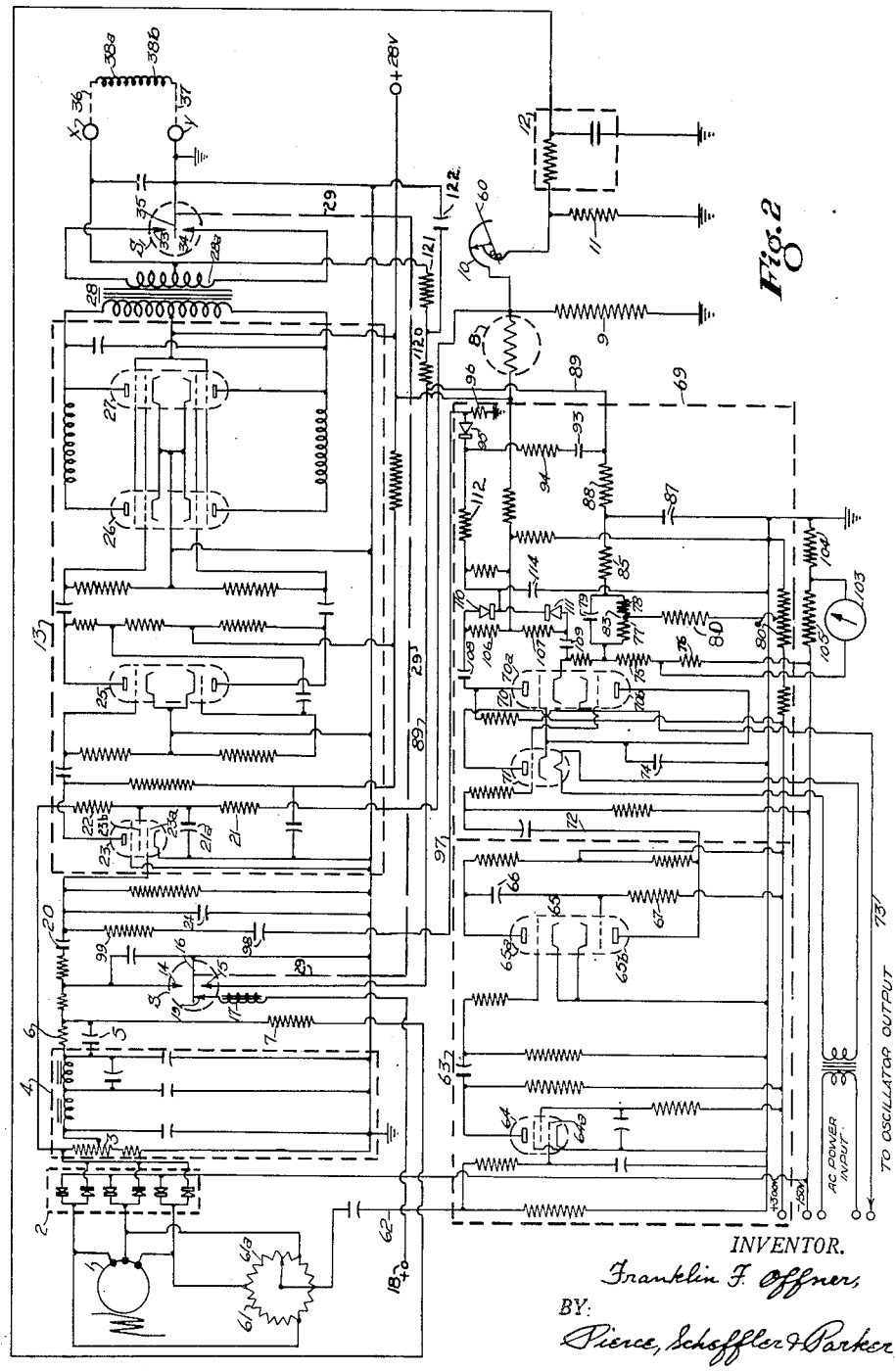
Figure 3:
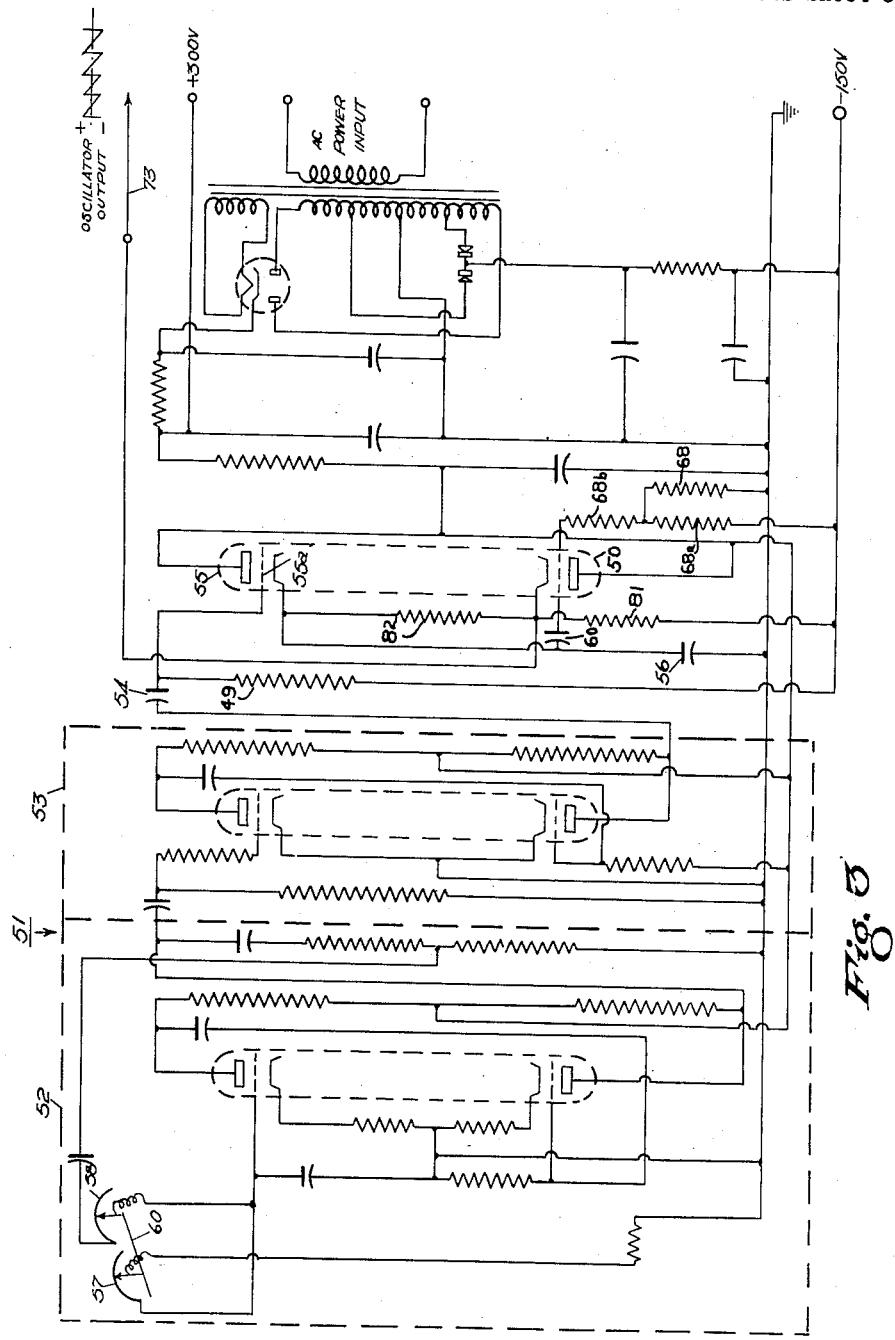
Figure 4:
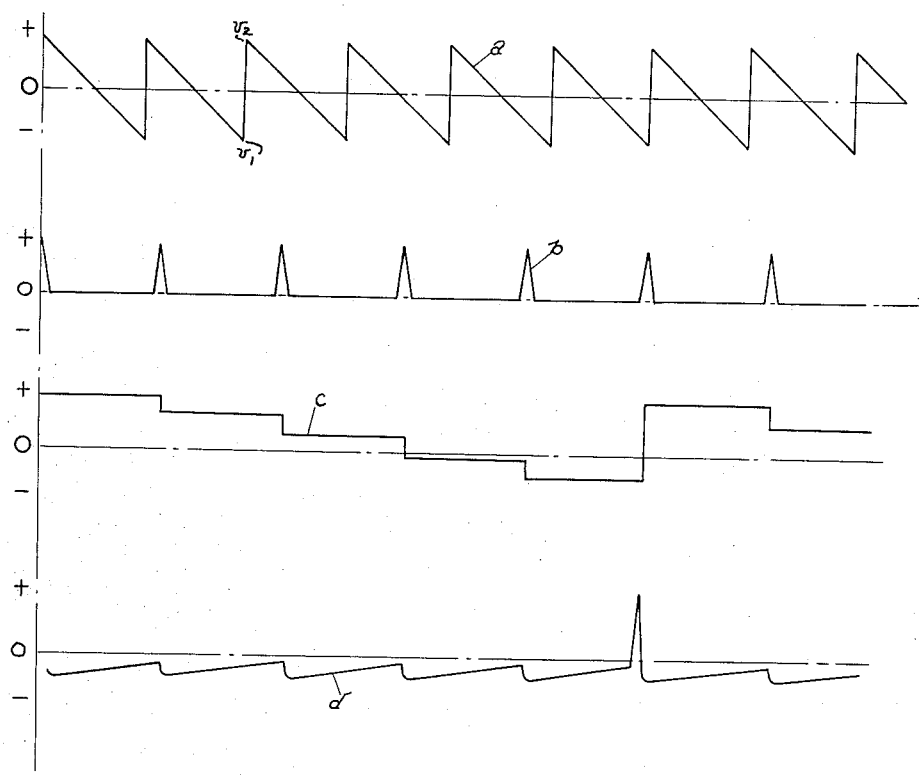
Figure 5:
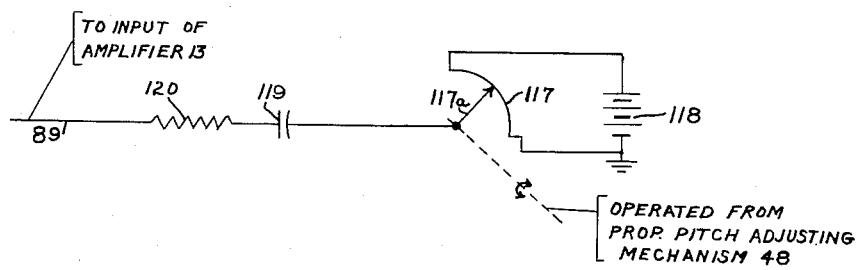

These and other objects and advantages to be derived from the invention will become more apparent from the following detailed description of a preferred embodiment of the invention as applied to the control of a plurality of aircraft engines and from the accompanying drawings in which Fig. 1 is a diagrammatic view showing a pair of engines and the interrelation between the principal components of the governor system; Figs. 2 and 3 combined is a circuit diagram showing circuit details of the complete governor control for one of the engines; Fig. 4 is a set of curves showing the various electrical waves present in the control and their relation to each other; and Fig. 5 is a modified arrangement of the feed-back circuit in the Fig. 2 system for stabilizing the control.

Referring now to the drawings and in particular to Fig. 1, it will be seen that each of the aircraft engines A and B to be synchronized is equipped with a small tachometer generator 1 of the three-phase, alternating current type which is driven by the engine to deliver a three-phase speed voltage whose frequency and amplitude are proportional to the speed of the engine.

The speed control section of the complete system, which operates on the balanced or null signal principle takes a direct current speed voltage, compares it with a direct current reference voltage, and applies any difference between the two to the speed controlling member of the engine in such manner as to change the speed of the engine until the speed voltage rebalances with the selected amplitude of the reference voltage. Thus for example to increase engine speed, the reference voltage is increased to a value above the instant speed voltage. The unbalance between the two acts to effect an increase in speed of the engine until the speed voltage is equal to the new setting of the reference voltage.

The direct current speed voltage is derived by rectifying the alternating current output from generator 1 in a 3-phase rectifier unit 2. The direct current output voltage from the latter, which is of course proportional to the speed of engine A, is applied to a potentiometer 3 for calibration purposes. From the latter, the speed voltage is preferably put through a low-pass filter section 4 into a condenser 5 which in conjunction with resistors 6 and 7 differentiates the speed voltage to add to the voltage proportional to engine speed, a speed signal voltage component proportional to engine acceleration, i. e. the rate-of-change of the engine speed. The use of the derivative speed voltage combined with the first order speed voltage is preferable to use of the speed voltage alone in that it increases the operating stability by reducing any tendency of the system to "hunt" cyclically above and below the selected speed.

The direct current reference voltage is obtained from any suitable source. If the voltage is not entirely stable, it is advisable to first pass it from the +28 volt input terminal through a voltage regulator which in the present embodiment of the invention is constituted by an iron wire-in-hydrogen regulator tube 8. The output of the latter which creates a voltage drop in resistor 9 is adjusted by the speed control resistor 10 which in turn creates a voltage drop across resistor 11. The reference voltage is taken from resistor 11 and is further filtered in filter 12 to remove high speed fluctuations so that these will not adversely influence the input to the signal amplifier system.

The speed voltage produced from the generator 1 combined with the differentiated voltage component is now compared with the reference voltage introduced through resistor 7 by bucking the two together at the output of condenser 5 to derive a voltage signal equal to their difference. The difference between the two voltages may be taken ahead of the differentiating condenser 5 but the arrangement as described and shown has the advantage of limiting the engine acceleration rate when the speed control resistor 10 is changed in adjustment.

In the illustrated construction, the polarity of the difference signal voltage will be positive if the engine speed is less than that corresponding to a given setting of the potentiometer 10 that establishes the D. C. reference voltage, and negative if the engine speed is greater. The difference signal is then amplified to raise it to a range capable of actuating the speed controlling mechanism of the engine.

Direct current amplifiers are generally not stable over long periods of time or for changes in supply voltage. Accordingly, the difference signal voltage is chopped by a vibrator type switch S, or some other equivalent type of interrupter, into square wave signals at the input of the multi-stage amplifier 13. Vibrator switch S includes stationary contacts 14, 15 and a grounded vibrating blade contact 16 therebetween driven by coil 17. The latter is energized from source 18 and the energizing current is periodically made and interrupted through contact 19 and blade 16.

The difference voltage signal is applied to stationary contact 14 of vibrator switch S and periodic grounding through blade 16 produces the desired square wave input pulses. These are coupled through condenser 20 to the signal grid 23a of the pentode tube 23 which is the first stage of amplifier 13. Condenser 24 may be shunted across the amplifier input to by-pass undesired high frequencies which may be generated by the contacts of vibrator S.

The remaining stages of the amplifier section 13 comprising double tubes 25, 26, 27 are conventional, push-pull, up to the output transformer 28. The amplified signal voltage developed across the secondary 28a is rectified by another vibrator switch S1 having stationary contacts 33, 34 and a contact blade 35 which is linked mechanically with contact blade 16 of switch S for operation between contacts 33, 34 in synchronism with the latter by the same coil 17. For convenience in drawing the circuit, switches S and S1 have been separated and the linkage between the contact blades of the two designated by the dashed line 29. Opposite ends of the transformer secondary 28a are connected to stationary contacts 33, 34, the vibrating blade contact 35 therebetween is grounded at terminal $y$ and a connection is taken from the mid-point on secondary 28a to terminal $x$. Thus the rectified voltage appearing across output terminals $x$ and $y$ of amplifier 13 is identical with the input but of course greatly amplified. It will also be of the same polarity as the input signal, the polarity being dependent upon the sense of the difference between the speed voltage and the reference voltage.

The amplified direct current voltage signal is applied via connections 36, 37 to the series connected toroidal coils 38a, 38b of a proportional solenoid 38 which functions to adjust the pitch of the propeller 39 of engine A in accordance with the polarity of the signal voltages transmitted through amplifier 13. Proportional solenoid 38, of the type described in more detail and claimed in my copending application Ser. No. 68,862, filed January 3, 1949 and in the application of Stanley G. Best Ser. No. 782,535, filed October 28, 1947, also includes an armature 38c biased to a symmetrical position between coils 38a and 38b by springs 38d, 38e, that actuates piston 39a of a pilot valve 39. Oil taken from engine A via duct 40 has its pressure raised in pump 41, the high pressure oil being fed through duct 42 to an upper inlet port 43 to the pilot valve cylinder 39b. An outlet port 44 connects the lower end of cylinder 39b via duct 45 to the lower pressure return duct 40, and a high pressure outlet port 46 at the middle of cylinder 39b serves to feed high pressure oil via duct 47 to the propeller pitch-changing mechanism indicated generally by numeral 48 at the forward end of engine A. The details of construction of the hydraulic pitch changing mechanism do not per se form a part of this invention and hence in the interest of simplifying the drawings and description have not been illustrated. The structure is well known at the present time and it is sufficient for purposes of this invention to say that an increase in propeller pitch is obtained by increasing the pressure of the oil supplied to the hydraulically operated mechanism 48. A decrease in oil pressure results in a decrease in propeller pitch.

The proportional solenoid 38 also includes a toroidal permanent magnet 38f, for setting up a permanent magnetic field which when combined with the magnetic field produced electromagnetically by the signal current in coils 38a, 38b produces axial movement of armature 38c and hence valve piston 39a in one direction or the other from its neutral position dependent upon the sense of the current flow through these coils, which in turn depends upon the polarity of the rectified output signal at the output terminals $x$—$y$.

When armature 38c occupies its neutral position corresponding to a no-signal condition in the system, piston 39a occupies the position shown in the drawing wherein both the upper and lower ports 43, 44 are closed. When a change-speed signal order for the engine A of negative polarity is transmitted through the amplifier 13 to call for a decrease in engine speed, the signal current applied to solenoid coils 38a, 38b will cause the armature 38c and valve piston 39a to move upwardly. This uncovers high pressure inlet port 43 and causes the high pressure oil to flow outwardly through duct 47 in the direction of the pitch-changing mechanism 48 thereby resulting in an increase in propeller pitch. Conversely, when a change-speed order signal of positive polarity calling for an increase in speed reaches solenoid windings 38a, 38b, valve piston 39a moves downwardly, opening port 44 and permitting oil to flow outwardly from the pitch-changing mechanism 48 through duct 47 in the direction of the valve cylinder 39b and through port 44 and duct 45 to the oil sump in the engine.

As a safety precaution, a connection is made from the screen grid 23b of the first stage 23 of the amplifier through resistor 21 and condenser 21a to one side of the regulator tube 8 of the D. C. reference voltage supply. The object of this is to reduce the screen voltage on tube 23 to zero in the event of failure of the regulator tube 8 and block signal transmission through tube 23. This is desirable for otherwise if tube 8 short circuits a large erroneous signal would be transmitted through amplifier 13 causing the propeller on the engine to go violently in the direction to produce decreased engine speed. To assure complete signal cut-off at tube 23 in such an event, a small negative voltage from rectifier 2 is added to the screen grid 23b through resistor 22.

Engine B, as shown in the block diagram of Fig. 1 as well as all other engines in the system to be synchronized is provided with the same type of solenoid 38 and pitch controlling mechanism 48 as well as generator 1, rectifier 2 and amplifier 13 and works in the same manner as the system described above for engine A. The reference voltage for all engines is taken from the same potentiometer 10 and hence all engines will run at the same speed, the particular speed being chosen by a selected adjustment of the take-off voltage setting on the potentiometer 10.

In operating a plurality of rotary machines, especially those on aircraft, it is desirable because of vibration effects, which are disturbing if constantly changing due to varying phase relationships between engines, to run the engines not only at the same speed but also to synchronize their relative phases so that all propellers will rotate in a fixed phase relationship. They may rotate at the same phase or at different but fixed phase positions relatively to one another.

In accordance with this invention, phase synchronization is established by means of the phase governor section of the system. As a foreword, the latter also operates on the null principle and derives a control signal which is a function of the instantaneous difference between the phase of each engine and a reference phase device. As will be later and more fully explained, the control signal indicative of a departure in the engine phase from the reference phase either in the advance or retard direction is put through amplifier 13 and applied via solenoid 38 to alter the setting of the pitch changing mechanism 48 in such direction as will cause the engine to change its speed until the engine phase is again synchronized with that of the reference phase device.

The device for establishing the reference phase is an electronic saw-tooth voltage wave generator 51. As shown in Fig. 3, the saw-tooth wave is derived from a sine wave voltage produced by a resistance tuned R. C. type oscillator stage 52 that is converted into a narrow positive peak wave in a wave-shaping two stage amplifier unit 53. The peaked waves from the latter are coupled via condenser 54 to the signal grid 55a of tube 55 which with its associated circuit components converts the input peaked waves into waves having the desired saw-tooth form.

Briefly, condenser 56 is charged by the brief current flow through tube 55 when the positive peak of the wave from the wave shaping circuit 53 applied through condenser 54 causes the bias on the grid of tube 55 applied through resistor 49 to be less than cut-off. The voltage across condenser 56 is shown by curve $a$ of Fig. 4, and is seen to be of the desired saw-tooth form. The current pulse through tube 55 causes the voltage across condenser 56 to go from $v_1$ to $v_2$. If the voltage at $v_1$ is some fixed value, the voltage $v_1$—$v_2$ will depend only on the shape of the peaked wave from the peaking circuit 53, and not at all on the frequency. The reason for this is as follows: The alternating component of the voltage on condenser 56 is applied to the grid of tube 50 through condenser 60; the average grid bias on tube 50 is held constant through resistors 68, 68a and 68b. Tube 50 acts as a cathode follower, so that the alternating voltage existing across its cathode resistor 81 is only slightly less than across condenser 56. Therefore, the current flowing through resistor 82 will be very much less than if it were connected to a fixed voltage. If then the average voltage across condenser 56 should tend to increase, due to increased pulse frequency, there will be a large increase in the current through resistor 82, since the average voltage across cathode resistor 81 is constant and there was originally only a slight difference between the voltages across resistor 81 and condenser 56. This increased current through resistor 82 will quickly discharge condenser 56 until its average voltage returns practically to its original value. This will then place the voltage at $v_1$ at its former value, so that $v_1$—$v_2$ is again the same voltage, and the amplitude of the wave remains substantially constant, irrespective of the change in the applied sine wave frequency.

To alter the frequency of the saw-tooth wave output across condenser 56, variable resistors 57, 58 are used. These resistors which are connected into the tuning circuit of the sine wave oscillator stage 52 and also ganged for adjustment simultaneously with speed control resistor 10 of the speed control section by means of a manual control 59, and coupling shaft 59a adjust the frequency of the sine wave output from oscillator 52. If the oscillating frequency of the latter is increased for example there will be an increase in the frequency of the peaked wave output from stage 53 and hence an increase in frequency at which condenser 56 is charged and discharged. Conversely a decrease in sine wave oscillator frequency will be reflected by a corresponding decrease in the repetition rate of the saw-tooth phase reference voltage wave.

The engine phase, i. e. an alternating current voltage whose frequency varies with the speed of engine A is taken from the engine driven three phase generator 1 previously described. The 3φ sine wave output of the latter is tapped into a continuous ring resistor 61 at tap points spaced 120° apart and an adjustable contact arm 61a on the resistor provides for varying the output of the generator at the contact arm 61a through 360°. Thus resistor 61 functions as a means for providing an engine phase sine wave voltage whose frequency is equal to that of the engine speed and whose phase may be adjusted through 360°. If all engines are to be run at the same phase, then the several phase shifting resistors arms 61a (there being a phase shifter 61 for each engine) would all be adjusted to the same setting. If, however, it should be desired to control the relative phases as between different engines in the group, the adjustable arms 61a can be adjusted to different settings.

The alternating current voltage wave appearing at resistor arm 61a is led via conductor 62 to an electronic pulse generator 63 whose function is to convert the sine wave input into peaked positive voltage pulses, there being one pulse for each cycle of the sine wave input. Pulse generator 63 includes an amplifier stage 64 to the input signal grid 64a of which is connected the sine wave output at resistor arm 61a. In general, the output of amplifier 64 will be somewhat overloaded resulting in a wave form that is partially square rather than a sine wave. This output is further amplified in the upper section 65a of a dual triode 65, making the output of tube section 65a essentially a square wave, that is differentiated by condenser 66 operating into resistor 67 in the grid circuit of the lower tube section 65b. As resistor 67 is returned to +300 volts, the lower tube section 65b will normally be drawing full plate current making the plate the least positive it can become. The differentiated negative output wave from tube section 65a will therefore only be effective in reducing the plate current of tube section 65b at the peak of the negative waves. This thus produces short, positive output voltage pulses from the lower tube section 65b, there being one pulse for each revolution of engine A.

Up to this point it will be seen that as to the phase synchronizing section there has been derived (1) a saw-tooth wave reference voltage across condenser 56 whose phase and frequency is related directly to the phase and frequency of the sine wave oscillator 52, and (2) a train of positive peaked voltage pulses whose phase and repetition rate are directly related to the phase and speed of engine A. The wave form of the saw-tooth generator is shown by plot $a$ in Fig. 4, and the pulse form of a typical output from pulse generator 63 is shown by plot $b$ in Fig. 4. It will be evident from the relation as to time between these two plots that the repetition rate of the engine phase voltage pulse is slightly slower than that of the reference phase saw-tooth voltage which means that the speed frequency of the engine is slightly less than the reference saw-tooth frequency and needs to be raised until the two again have the proper phase relationship.

As previously explained, a signal voltage proportional to any difference between the phases of the reference saw-tooth wave and the peaked pulse wave from the engine is derived by comparing the two waves $a$ and $b$. The system components grouped within the rectangle 69 for making the comparison includes a double triode 70, a single triode 71 and circuit components associated therewith which will presently be described. The positive peaked voltage pulses at the output of tube section 65b are connected via lead 72 into the signal grid inputs of tube 71 and the lower section 70b of the double triode 70. The fixed bias on these two input grids is so adjusted that no anode current can flow through either tubes 70b or 71 except when positive pulses are applied to the grids from the pulse generator 63. The saw-tooth reference voltage is led from the output terminals via conductor 73 to the cathode of tube section 70b and to the plate of tube 71. The effect of applying the positive pulses from generator 63 to the input grids of 70b and 71 will be to electronically commutate the saw-tooth voltage wave for each voltage pulse. This commutation is produced since tubes 71 and 70b only are conducting when the peaked waves are applied to their grids. Thus if 74 is negative with respect to the saw-tooth wave at this instant, current will flow from 74 through 71 to the oscillator; while if 74 is positive, current will flow from the oscillator to 74 through 70b. Thus a phase difference voltage wave will be developed across an energy storing device such as condenser 74, such as shown by plot $c$ in Fig. 4 which is amplified in the upper triode section 70a. It is evident from plot $c$ that the phase difference voltage at condenser 74 corresponds in polarity and magnitude to that of the saw-tooth wave at each commutating instant and is a constant between commutating cycles, and furher is proportional to the phase difference at the start of each cycle. With a rather slowly changing phase, a rather broadly stepped wave $c$ is produced. A selected portion of the amplified voltage wave $c$ developed across resistors 75, 76 is passed through resistors 77, 78 and condenser 79, in parallel. In this manner the output is partially differentiated. By selecting the proper time-constant for the differentiating circuit, a difference voltage depending upon phase and speed difference is produced as the phase difference between the engine and saw-tooth oscillator increases up to the point where the voltage pulse from generator 65 commutates the saw-tooth voltage wave at the instant it passes from its maximum negative value $v_1$ to its maximum positive value $v_2$. At this instant, as shown in plot $c$ of Fig. 4, the phase difference voltage abruptly changes; and the phase derivative voltage, at $d$ Fig. 4, turns abruptly upward to a much larger voltage of reversed polarity.

Under the engine condition assumed for purposes of illustration, where the engine phase is "retarding" and needs to be increased to synchrophase it with that of the saw-tooth wave, the stepped wave $c$ is seen to be a cyclically decreasing one from positive to negative polarity. Hence, the differentiated wave $d$ is of negative polarity until reversed at the end of each step cycle. If on the other hand, the engine phase should be "advancing" in phase relative to that of the saw-tooth, the stepped wave $c$ would be reversed in its slope and cyclically increase from negative to positive polarity thus reversing the polarity of the differentiated wave $d$ from negative to positive.

A positive direct current voltage is inserted through resistor 89 and adjusted by resistor 89a. This latter voltage is so adjusted that the total voltage existing at the junction 83 of resistors 77 and 78 is zero when the phase of the saw-tooth voltage wave has the proper relation to that of the positive voltage pulses from pulse generator 63.

Any irregularities existing in the combined differentiated and difference phase voltages are first filtered out by resistor 85 and condenser 87, and the filtered voltage is taken through resistor 88 and via conductor 89 to the lower stationary contact 15 on vibrator switch S where it is periodically grounded or "chopped" by the vibrating blade contact 16 to convert the voltage into essentially square wave pulses. The chopped signal voltage indicative of the presence of a difference in the desired phase relation is then introduced through condenser 93, resistor 94 and rectifier valve 95 to the input of amplifier 13. The input signal voltage which is developed across resistor 96 and led via conductor 97, condenser 98 and resistor 99 to the signal grid of the first stage 23 of the amplifier duly appears at the output transformer 28 where, like the speed signal voltage previously described, it is rectified by vibrator switch S1 and passed to the proportional solenoid 38. As previously explained, the polarity of the differentiated phase difference signal will be negative if the engine A is retarding in phase relative to that of the saw-tooth generator 51, and its effect on the solenoid 38 will be such as to result in a decrease in pitch of the propeller to thereby speed the engine up until phase synchronization has been reestablished. On the other hand, the polarity of the differentiated phase difference signal will be positive if the engine phase is advancing relative to that of the saw-tooth generator and results in an increase in propeller pitch and hence a decrease in engine speed.

In a similar manner, the phase difference voltage is transmitted through resistors 77 and 78, and similarly filtered through resistor 85 and condenser 87, and transmitted through the same path as the derivative voltage. This signal tends to increase engine speed if the phase is lagging; and decrease speed if leading.

The combined effect of the two signals is to bring the two phases and speeds into synchronism.

In the system so far described, signals of one polarity from the speed control section bring about the same relative effect on engine speed as signals of opposite polarity from the phase control section. The need for this becomes apparent when one considers the 180° phase reversal of the signals from the speed and phase control sections at the contacts of the two vibrator switches S and S1 at the input and output sides of the amplifier.

A meter 103 is connected in a bridge circuit with bridge arm resistors 104, 105, and 78 so that the meter reads zero, which is center scale, when the phase of the engine A has the correct relation to that of the saw-tooth generator 51. This is used in adjusting the direct current balance control potentiometer 3 and the centering control resistor 89a.

The illustrated phase displacement between the saw-tooth wave $a$ and the pulse train $b$ has been somewhat exaggerated for purposes of explaining the system fully. Under normal operating conditions the response of the system to phase difference signals is most rapid and any departure in the phase relationship desired would be detected and corrected before the two had reached the deviation shown. However, if it be assumed that for some reason the deviation in phase reaches that as illustrated, a step voltage wave $c$ would be produced. If such be the case, the sudden reversal of the derivative of the phase difference voltage wave $d$ at the end of each cycle of the latter must be excluded from the system; otherwise instability in operation will result from the transmission of a signal of wrong polarity. The preferred way of avoiding this is to provide a circuit so that when for example a negative stepped phase difference voltage occurs, due to the engine being (e. g.) at too low a speed and retarding in phase more than 180 degrees, the phase voltage signals derived from condenser 74 are disconnected from the output.

One suitable way of accomplishing the result desired consists of a phase inverter circuit with a differentiating network composed of resistors 106, 107, condensers 108, 109, and unidirectional conducting devices 110, 111, which may be solenium rectifiers, connected in the anode-cathode circuit of the phase difference voltage amplifier triode 70a.

In operation, when the phase difference between engine A and the generated saw-tooth wave stays in the range of plus or minus 180 degrees, which is the normal operating condition, rectifier 95 transmits the phase difference signals practically unattenuated to the input of amplifier 13. Normally rectifiers 110, 111 are biased past cut-off, so that no current is transmitted through them to condenser 114. In the drawing, the convention observed is that electron flow through the rectifiers is in the direction of the arrow. However, when the phase difference becomes greater than 180 degrees, so that a step impulse is produced at the end of each cycle of the phase difference voltage, a large enough voltage is produced across resistors 106, or 107 so that current will flow through either rectifier 110 or 111 depending upon whether the engine speed is too high or too low, charging condenser 114 thus biasing past cut-off rectifier 95 through resistor 112 and resulting in a cut-off of the phase difference signal through rectifier 95 while the signal is incorrect. Thus rectifier 95 acts as a switch to block passage of any incorrect signal voltages caused by the sudden reversal in polarity of the differentiated phase difference voltage at the end of the cycle.

If the engine speed is far offspeed, rectifier 95 will be cut off continuously and no phase synchronizing signal will be passed to solenoid 38. In such event, the D. C. speed governor section previously described takes over the control.

The above described system for controlling both the speed and relative phases of a plurality of engines in accordance with a master control may under some conditions exhibit a tendency to "hunt," i. e.—go into a continuous cyclic change in speed above and below the exact speed set on the master control. To minimize the hunting effect, the system is preferably provided with a feed-back circuit. One suitable circuit is shown in Fig. 5. The pitch angle of the propeller 39, or the position of the fuel valve if engine speed is to be controlled by regulating the position of the fuel control directly, is transmitted by the pitch changing mechanism 49 to the adjustable arm 117a on potentiometer 117 which is energized from a suitable source of direct voltage such as battery 118. Any change in the position of the pitch changing mechanism 48 is accordingly reflected by a corresponding change in the output voltage of potentiometer 117 which transmits a voltage signal through condenser 119 and resistor 120 back to the input of the amplifier 13 over the same circuit as that which is used to transmit the phase difference signals. It should be noted that the feed-back circuit of Fig. 5, as previously explained at the beginning of the specification, is an alternative arrangement for the corresponding portion of the circuit in Fig. 2 and, if used in lieu thereof, would require the removal of resistor 121 and condenser 122 from the Fig. 2 circuit.

In the Fig. 5 circuit, the polarity of the voltage signal fed back is such that it tends to make the pitch changing mechanism 48 move in the opposite sense to thereby remove the control signal being applied at that particular instant. If condenser 119 were omitted, each position of the pitch changing mechanism 48 would then correspond, for balance, to a different input voltage from the speed and phase governor sections, as the total input to amplifier 13 must be zero. To eliminate this "droop" characteristic, condenser 119 is inserted. This then gives a "temporary droop," but the signal transmitted back for a steady position of the pitch changing mechanism 48 is zero.

Since the velocity of the motion of the pitch changing mechanism 48 is proportional to the output voltage signal from the amplifier 13, a voltage proportional to the instant position of the pitch changing mechanism 48 may also be obtained by integrating the amplifier output. If this is accomplished through an R. C. type integrator, a "temporary droop" voltage similar to that produced in the Fig. 5 circuit will be obtained. The latter is the type of feed-back control shown in the Fig. 2 circuit, the integrator being comprised of resistors 120 and 121, and condenser 122. The time constant of these three components is chosen to give the optimum stabilization effect. As with the Fig. 5 circuit, the feed-back signal after being chopped by switch S is transmitted to the amplifier input over the same circuit as the phase difference signal. This arrangement offers the further advantage that when the engine is far off from its selected synchronous speed, and the phase difference signals are hence cut off at rectifier 95 in the manner already explained, the feed-back stabilizing signal will likewise be cut off from the control system and thereby enable the latter to reattain synchronism much more quickly.

In the embodiment of the invention which has been described and shown, the pulse generator 63 is operated from the generator driven by the engine to deliver a pulse repetition rate that varies with engine speed, and the saw-tooth generator 61 operated at a selected fixed frequency serves as the master control. It is to be understood however that the controls for the pulse and saw-tooth generators may, if desired, be reversed in function without changing the final result, in which case the pulse generator 63 set to operate at a fixed repetition rate would serve as the master control, and the saw-tooth generator would operate at a repetition rate variable with the speed of the engine. The illustrated arrangement is preferred, however, since it requires a somewhat less number of tubes.

In conclusion, it will be appreciated that the novel speed and phase governor system which has been described functions to regulate both the speed and phase of one or more rotating members to which the system is applied and also to allow the phase of any one of the members to be adjusted relative to the other. As stated above, both the speed and phase governor sections of the system act conjointly to adjust the speed of the rotating member when necessary to reestablish synchronism with the master control. While signals from both the speed and phase governor sections exist simultaneously at the amplifier output, for very small deviations in speed of the rotating member from the selected speed as set on the master control which is indicative of a very slow deviation in phase, the signal from the phase governor section overrides the signal from the speed governor section and hence the former becomes the effective signal for bringing the rotating member back into synchronism. However, for greater deviations in speed which therefore also indicate a large phase deviation, where the phase governor signals are repeatedly blocked out from the amplifier, the signals from the speed governor section obviously take over the control to effect the necessary change in speed of the rotating member. Furthermore, while the invention has been described with respect to its application to a plurality of functionally related rotating members, it will be evident that it can be used as well for speed and phase control of but a single rotating member.

Having now fully described and illustrated a preferred form of the invention, I claim:

1. A phase governor system for a rotating member comprising a generator device producing a saw-tooth wave, a device for commutating the saw-tooth wave produced from said saw-tooth generator device, one of said devices being operated by said rotating member at a frequency proportional to the speed of the member and the other operated at a selected constant frequency, circuit means connecting said commutating device in the output of said saw-tooth wave generator device to convert the wave of the latter into a voltage proportional to the deviation in the commutation phase from a preselected phase relationship with said saw-tooth wave, and means responsive to said voltage for altering the speed of the member in accordance with the magnitude and polarity of said voltage.

2. A phase governor system for a rotating member comprising a generator producing a saw-tooth wave, a pulse generator, one of said generators being operated by the rotating member at a frequency proportional to the speed of the member and the other operated at a selected constant frequency, circuit means interconnecting said generators to commutate the wave of the saw-tooth generator by the pulse generator, energy storing means connected in circuit with said saw-tooth generator and which takes on a voltage corresponding to that of the saw-tooth wave at each commutating instant, and means controlled by the voltage of said energy storing means for controlling the speed of the rotating member in accordance with the magnitude and polarity of said voltage.

3. A phase synchronizing control system for a rotating member comprising, means producing a train of sharp voltage pulses at a repetition rate proportional to the speed of the member, a saw-tooth wave generator adjustable in its repetition rate, means including a device commutating said saw-tooth wave with said pulse train to produce a voltage signal upon a departure in the phase relationship therebetween from a preselected normal, and the polarity of which signal is determined by the sense of the departure in phase, and electro-controlled reversible speed changing means for said rotating member responsive to said signal for altering the speed of the member in accordance with the polarity of the signal.

4. A phase synchronizing control system for a rotating member comprising an alternating current generator driven by the member and which delivers an output voltage wave at a frequency proportional to the speed of the member, means converting said wave into peaked voltage pulses whose repetition rate is equal to the frequency of said wave, means generating a saw-tooth voltage wave at a selected frequency, means including a device commutating said saw-tooth wave with said voltage pulses to produce a voltage signal upon any deviation in a preselected phase relationship therebetween and whose polarity is determined by the sense of the deviation in phase, and a speed control for said member responsive to said voltage signal for altering the speed of the member in accordance with the polarity of said signal.

5. A phase governor system for a rotating member comprising, a generator producing a train of voltage pulses, a saw-tooth wave generator, one of said generators being driven at a frequency variable with variation in speed of said member and the other at a selected constant frequency, a grid-controlled commutating tube connected to the output of said saw-tooth generator, said tube being biased to cut-off, circuit means applying said pulse train to the grid of said tube to render the latter conductive at each pulse, an energy storing device connected in the cathode-anode circuit of said tube, the voltage and polarity of said device being determined respectively by the voltage and polarity of the saw-tooth wave at the instant of commutation, and polarity sensitive electro-controlled reversible speed changing means for said rotating member responsive to the voltage from said energy storing device for altering the speed of the member in accordance with the polarity thereof.

6. A phase governor system for a rotating member comprising, a generator producing a train of sharp voltage pulses, a saw-tooth wave generator, one of said generators being operated at a repetition rate proportional to the speed of the member and the other at a selected constant repetition rate, a grid-controlled commutating tube connected to the output of said saw-tooth generator, said tube being biased to cut-off, circuit means applying said pulse train to the grid of said tube to render the latter conductive at each pulse, a condenser connected in the output circuit of said commutating tube and which exhibits a voltage determined by the voltage of the saw-tooth wave at each commutating instant, means differentiating the voltage across the condenser to add to it a voltage signal whose polarity is determined by the relation between the repetition rates of said pulse train and saw-tooth voltage wave, and a speed control for said rotating member responsive to said voltage signal for altering the speed of the member in accordance with the polarity thereof.

7. In a phase governor system for a rotating member, in combination, a polyphase alternating generator, a phase changer connected to the output of said generator for producing a single alternating voltage wave of adjustable phase, a pulsing device for converting said wave into a train of voltage pulses, a generator producing a saw-tooth voltage wave, one of said generators being driven at a frequency proportional to the speed of said member and the other at a selected constant frequency, circuit means interconnecting the output of said pulsing device with said saw-tooth generator for commutating the saw-tooth wave, energy storing means connected in circuit with said saw-tooth generator and which takes on a voltage corresponding to that of the saw-tooth wave at each commutating instant, and means controlled by the voltage of said energy storing means for adjusting the speed of the rotating member in accordance with the magnitude and polarity of said voltage.

8. In a phase governor system for a polarity of related rotating members, in combination, an alternating current generator driven by each member, a phase adjusting device connected to the output of each generator, a pulsing device individual to each said member for converting the output wave of each generator into a train of voltage pulses at a repetition rate equal to the frequency of the voltage wave, a master generator producing a saw-tooth wave at a selected repetition rate, means individual to each rotating member and including a device for commutating said saw-tooth wave with each of the voltage pulse trains produced therefrom to derive a voltage signal upon a change in the respective preselected phase relationships between said saw-tooth wave and any of said pulse trains, said voltage signal having a polarity determined by the sense of the phase change, and electro-controlled reversible speed change means for each rotating member responsive to the associated voltage signal for altering the speed of the member in accordance with the polarity of the signal.

9. In a synchrophasing control system for a plurality of rotating members, in combination, an alternator driven by each member, a phase changer connected to the output of each alternator for adjusting the phase of the alternator wave, a pulsing device individual to each member for converting each of said waves into a train of sharp voltage pulses at a repetition rate equal to the frequency of the voltage wave, a master generator producing a saw-tooth wave at a selected repetition rate, means individual to each member for commutating said saw-tooth wave with each of said pulse trains, energy storing means connected in the output of each of said commutating means and which takes on a voltage corresponding to that of the saw-tooth wave at each commutating instant, and electro-controlled reversible speed change means for each rotating member responsive to the voltage of the associated energy storing means for altering the speed of each member in accordance with the polarity of said voltage.

10. A control system as defined in claim 9 wherein each of said commutating means is constituted by a normally non-conductive grid-controlled valve connected to the output of said saw-tooth wave generator, said energy storing means is comprised of a condenser connected in the output of each said valve, and the pulse trains are each respectively connected into the respective grid circuits of the several valves to render each conductive at the pulse instant.

11. In a combined speed and phase governor system for a rotating member, in combination, an alternator driven by said rotating member, means producing a master electrical wave, means deriving a first voltage signal representative of the deviation in phase of the alternator wave from the master wave, means producing a master reference voltage, means deriving a second voltage signal representative of the deviation in voltage of the alternator wave from the master reference voltage, said first and second voltage signals being reversed in polarity upon a reversal in the sense of the deviations, and electro-controlled means responsive to said signals for adjusting the speed of the member up or down as the case may be in accordance with the polarity of the signals.

12. In a combined speed and phase governor system for a rotating member, in combination, means producing a first voltage signal representative of the deviation in phase of the rotating member from a master reference phase, the polarity of said signal being reversed with a reversal in the sense of the phase deviation, means producing a second voltage signal representative of the deviation in speed of the rotating member from a master reference speed, the polarity of said second signal being also reversed upon a reversal in the sense of the speed deviation, said first and second signals being of opposite polarity for like senses in the phase and speed deviations, an amplifier, periodically actuated switches at the input and output of said amplifier for alternately connecting said first and second signals to the amplifier input and for rectifying the amplified signals at the amplifier output, and electro-controlled means responsive to the signals for adjusting the speed of the rotating member in accordance with the polarity of said signals.

13. In a combined speed and phase governor system for a rotating member, in combination, an alternator driven by said rotating member, means producing a master electrical wave, means deriving a first voltage signal representative of the deviation in phase of the alternator wave from the master wave, means producing a master reference voltage, means deriving a second voltage signal representative of the deviation in voltage of the alternator wave from the master reference voltage, said first and second voltage signals being of opposite polarity for like senses in the phase and voltage deviations, an amplifier, periodically actuated switches at the input and output of said amplifier for alternately connecting said first and second signals to the amplifier input and for rectifying the signals of the amplifier output, and electro-controlled means responsive to the signals for adjusting the speed of the rotating member in accordance with the polarity of said signals.

14. In a speed and phase governor system for a rotating member, in combination; an alternator driven by the member and which delivers a wave voltage at a frequency proportional to the speed of the member; a phase governor section comprising, a device for generating voltage pulses, a device for generating a saw-tooth wave, one of said devices being controlled by said alternator for varying the repetition rate of the device in accordance with variations in the speed of the rotating member and the other device being operated at a selected constant repetition rate, means controlled by said voltage pulses for commutating said saw-tooth wave, energy storing means connected to said commutating means and which exhibits a voltage that corresponds to the voltage of the saw-tooth wave at each commutating instant and which is proportional to the deviation in a predetermined phase relationship between said voltage pulses and said saw-tooth wave; a speed governor section comprising, a rectifier converting the output of said alternator into a direct speed voltage at an amplitude proportional to the amplitude of the alternator wave, means producing a constant reference direct voltage, means obtaining the difference between said speed and reference voltages, means controlled jointly by the voltage of said energy storing means and said difference voltage for adjusting the speed of said rotating member in accordance with the magnitude and polarity of the voltages, and means responsive to a sudden change of the voltage of said energy storing means for blocking out the latter from the control of said speed adjusting means for a predetermined period following the sudden change.

15. A speed and phase governor system as defined in claim 14 wherein said blocking means is comprised of a valve in the transmission circuit of the voltage from said energy storing means, and the conductivity of which is determined by a voltage produced from the voltage of said energy storing means.

16. In a speed and phase governor system for a rotating member, in combination; an alternator driven by the member and which delivers a wave voltage at a frequency proportional to the speed of the member; a phase governor section comprising, a pulsing device connected to the output of said alternator for converting the voltage wave into a train of sharply peaked voltage impulses having a repetition rate equal to the wave frequency, a sawtooth wave generator, means for adjusting the repetition rate of said saw-tooth wave, means including a device commutating said saw-tooth wave by said train of pulses to produce a voltage signal upon a departure in the phase relationship therebetween from a preselected normal, the polarity of which signal is determined by the sense of the departure in phase; a speed governor section comprising, a rectifier converting the output wave of said alternator into a direct current speed voltage at an amplitude proportional to the amplitude of the alternator wave, means producing a reference direct current voltage, adjustable means operated jointly with the saw-tooth repetition rate adjusting means for adjusting the amplitude of said reference voltage, means obtaining the difference between said speed and reference voltages, said difference voltage having a polarity determined by the sense of the difference; and electro-controlled means for varying the speed of the rotating member responsive to the said voltage signal from the phase governor section and to the said difference voltage from the speed governor section.

17. In a speed and phase governor system for a rotating member, in combination; an alternator driven by the member and which delivers a wave voltage at a frequency proportional to the speed of the rotating member; a phase governor section comprising, a pulsing device connected to the output of said alternator for converting the voltage wave into a train of peaked voltage pulses having a repetition rate equal to the wave frequency, an electronic saw-tooth wave generator, means for adjusting the repetition rate of the saw-tooth wave, means including a device commutating said saw-tooth wave by said pulse train to produce a voltage signal upon a deviation in phase of the voltage pulses from a preselected phase relationship relative to said saw-tooth wave, said voltage signal having a polarity determined by the sense of the deviation in phase; a speed governor section comprising, a rectifier converting the output wave of said alternator into a direct current speed voltage, means producing a direct current reference voltage, means operated jointly with the saw-tooth rate adjusting means for adjusting the amplitude of said reference voltage, means comparing said speed and reference voltages to produce a speed voltage signal variable as the difference therebetween, said speed voltage signal having a polarity determined by the sense of the difference; an amplifier, periodically actuated switches at the input and output of said amplifier for chopping the voltage signals from said phase and speed governor sections to the amplifier input and for rectifying the same at the amplifier output; and electro-controlled reversible speed change means for said rotating member responsive to said amplified signals for altering the speed of the member in accordance with the polarity of the signals.

18. In a speed and phase synchronizing control system for a rotating member, in combination; means producing a train of voltage pulses having a repetition rate proportional to the speed of the rotating member, an electronic saw-tooth wave generator, means for adjusting the repetition rate of said wave, means including a device commutating the saw-tooth wave by said pulse train to produce a direct current voltage signal upon a deviation in phase of the voltage pulses from a preselected phase relationship relative to the said saw-tooth wave, said phase deviation voltage signal having a polarity determined by the sense of the deviation in phase; means producing a direct current speed voltage proportional to the speed of the rotating member, means producing a direct current reference potential, means actuated jointly with the saw-tooth wave repetition rate adjusting means for adjusting the amplitude of the reference voltage, means comparing said speed and reference voltages to produce a speed voltage signal variable as the difference therebetween, said speed voltage signal having a polarity determined by the sense of the difference; an amplifier, periodically actuated switches at the input and output of said amplifier for chopping the phase and speed voltage signals to the amplifier input and for rectifying the same at the amplifier output; and electro-controlled reversible speed change means for said rotating member responsive to said amplified signals for altering the speed of the member in accordance with the polarity of the signals.

19. In a speed and phase governor system for a plurality of related rotating members, in combination; an alternator individual to each member and driven thereby; a phase governor section comprising, a phase changing device connected to the output of each alternator for producing an alternating current voltage wave of adjustable phase, a pulsing device connected in the output of each phase changing device to convert the corresponding voltage wave into a train of voltage pulses whose repetition rate is equal to the wave frequency, an electronic generator producing a saw-tooth voltage wave varying between positive and negative maximums, means for adjusting the repetition rate of the saw-tooth wave, a grid-controlled normally non-conductive commutating valve for each pulse train and which are each connected to the output of said saw-tooth wave generator, connections between the pulse trains and the control grids of the several valves to render each of the latter conductive briefly at each pulse instant of the associated wave train, a condenser in the output of each commutating valve and which takes on a voltage corresponding to that of the saw-tooth wave at the commutating instant; a speed governor section comprising, means individual to each member for producing a direct current voltage proportional to speed of the member, means producing a reference direct current voltage, adjustable means operated jointly with the means for adjusting the repetition rate of the saw-tooth wave for adjusting the amplitude of the reference voltage, means comparing each of the speed voltages with the reference voltage to ascertain any difference therebetween, said difference voltages having a polarity determined by the sense of the difference; and electro-controlled reversible speed adjusting means individual to each rotating member for adjusting the speed of the member responsive to the associated condenser voltage from the phase governor section and to the associated difference voltage from the speed governor section.

20. In a speed and phase governor system for a rotating member, in combination; an alternator driven by the member and which delivers a wave voltage at a frequency proportional to the speed of the member; a phase governor section comprising, a pulsing device connected to the output of said alternator for converting the voltage wave into a train of sharply peaked voltage impulses having a repetition rate equal to the wave frequency, a saw-tooth wave generator, means for adjusting the repetition rate of said saw-tooth wave, means including a device commutating said saw-tooth wave by said train of pulses to produce a voltage signal upon a departure in the phase relationship therebetween from a preselected normal, the polarity of which signal is determined by the sense of the departure in phase; a speed governor section comprising, a source of direct current voltage proportional to speed of the member, means producing a reference direct current voltage, adjustable means operated jointly with the saw-tooth repetition rate adjusting means for adjusting the amplitude of said reference voltage, means obtaining the difference between said speed and reference voltages, said difference voltage having a polarity determined by the sense of the difference; and electro-controlled means for varying the speed of the rotating member responsive to the said voltage signal from the phase governor section and to the said difference voltage from the speed governor section.

21. A phase governor system for a rotating member comprising a generator device producing a repetitive wave, a device for commutating the wave produced by said generator device, one of said devices being operated by said rotating member at a frequency varying with the speed of the member and the other operated at a selected constant frequency, circuit means connecting said commutating device in the output of said generator device to convert the wave of the latter into a voltage varying with the deviation in the commutation phase from a preselected phase relationship with said repetitive wave, and means responsive to said voltage for altering the speed of the member in such sense as to restore the preselected phase relationship between said repetitive wave and commutating device.

22. A phase governor system for a rotating member comprising a generator producing a repetitive wave, a pulse generator, one of said generators being operated by the rotating member at a frequency varying with the speed of the member and the other operated at a selected frequency, circuit means interconnecting said generators to commutate the wave of said repetitive wave generator by said pulse generator, energy storing means connected in circuit with said repetitive wave generator and which takes on a voltage corresponding to that of the repetitive wave at each commutating instant, and means controlled by the voltage of said energy storing means for adjusting the speed of the rotating member.

23. A phase synchronizing control for a rotating member comprising, means producing a train of sharp voltage pulses at a repetition rate proportional to the speed of the member, a generator producing a repetitive wave at a selected rate, means including a device commutating said repetitive wave with said pulse train to produce a signal upon a departure in phase relationship therebetween from a preselected normal, and a speed adjusting device for said rotating member responsive to said signal for altering the speed of the member in such sense as will remove the signal.

24. In a phase governor system for a plurality of related rotating members, in combination, an alternating generator driven by each member, a phase adjusting device connected to the output of each generator, a pulsing device individual to each said member for converting the output wave of each generator into a train of voltage pulses at a repetition rate dependent upon the frequency of the voltage wave, a master generator producing a repetitive wave at a selected repetition rate, means individual to each rotating member and including a device for commutating said repetitive wave with each of the voltage pulse trains produced therefrom to derive a voltage signal upon a change in the respective preselected phase relationship between said repetitive wave and any of said pulse trains, and a speed adjusting device for each rotating member responsive to the associated voltage signal for altering the speed of the member in such sense as to remove the signal.

25. In a combined speed and phase governor system for a rotating member, in combination, a voltage wave generator driven by said member, a master generator producing a reference voltage wave at a selected frequency, means deriving a first voltage signal upon a departure of the wave produced by said member driven generator from a preselected phase relationship with said reference voltage wave, means producing a reference voltage, means deriving a second voltage signal representative of the deviation in amplitude of the voltage of the wave produced by said member driven generator from said reference voltage, and a speed adjusting device responsive to either of said voltage signals for altering the speed of the member in such sense as to remove the signal.

26. In a combined speed and phase governor system for a rotating member, in combination, means producing a first voltage signal representative of the deviation in phase of the rotating member from a master reference repetitive wave, means producing a second voltage signal representative of the deviation in speed of the rotating member from a master reference speed, and a common control means reponsive to either of said signals for adjusting the speed of the rotating member in such sense as to remove the signal.

27. In a combined speed and phase governor system for a rotating member, in combination, means producing a first voltage signal representative of the deviation in phase of the rotating member from a master reference repetitive wave, means producing a second voltage signal representative of the deviation in speed of the rotating member from a master reference speed as determined by the magnitude of a reference voltage, means for jointly adjusting the repetition rate of said master wave and the amplitude of said reference voltage, and a common control means responsive to either of said signals for adjusting the speed of the rotating member in such sense as to remove the signal.

28. In a combined speed and phase governor system for a rotating member, in combination, means producing a first voltage signal representative of the deviation in phase of the rotating member from a master reference phase, the polarity of said signal being reversed with a reversal in the sense of the phase deviation, means producing a second voltage signal representative of the deviation in speed of the rotating member from a master reference speed, the polarity of said second signal being also reversed upon a reversal in the sense of the speed deviation, and means responsive to either of said signals for adjusting the speed of the rotating member in such sense as to remove the signal.

29. In a speed and phase governor system for a rotating member, in combination; an alternator driven by the member and which delivers a wave voltage at a frequency dependent upon speed of the member; a phase governor section comprising, a pulsing device connected to the output of said alternator for converting said voltage wave into a train of corresponding peaked voltage pulses, a generator producing a master voltage wave, means for adjusting the repetition rate of said master wave, means including a device commutating said master wave by said pulse train to produce a voltage signal upon a departure in the phase relationship therebetween from a preselected normal; a speed governor section comprising, a rectifier converting the output wave of said alternator into a corresponding direct current speed voltage, means producing a reference direct current voltage, adjustable means operated jointly with the master wave repetition rate adjusting means for adjusting the amplitude of said reference voltage, means obtaining the difference between said speed and reference voltages, and speed control means for said member jointly responsive to said voltage signal from the phase governor section and to the said difference voltage from the speed governor section.

30. In a speed and phase synchronizing control system for a rotating member, in combination; means producing a train of voltage pulses having a repetition rate dependent upon speed of the rotating member, a master generator producing a voltage wave at a selected repetition rate, means including a device commutating said voltage wave by said pulse train to produce a first voltage signal upon a deviation in phase of the voltage pulses from a preselected phase relationship relative to said voltage wave; means producing a voltage dependent upon speed of the rotating member, means producing a reference voltage, means comparing said speed and reference voltages to produce a second voltage signal variable as the difference therebetween, and speed control means for said member jointly responsive to said first and second voltage signals for adjusting the speed of the member in such sense as to remove the signal.

31. A phase governor system for a rotating member comprising a device for generating voltage pulses, a device for generating a repetitive voltage wave, one of said generators being driven at a frequency dependent upon speed of the rotating member and the other at a selected frequency, means controlled by said voltage pulses for commutating said voltage wave, energy storing means connected to said commutating means and which exhibits a voltage signal corresponding to the voltage of said wave at each commutating instant and which is proportional to the deviation in a predetermined phase relationship between said voltage pulses and said voltage wave, means controlled by said voltage signal for adjusting the speed of the rotating member in such sense as to reduce the said phase deviation, and means responsive to a sudden change of said voltage signal for blocking out the latter from the control of said speed adjusting means for a predetermined period following said sudden change.

32. In a control system of the automatically rebalancing type wherein a voltage signal produced in accordance with the deviation in magnitude of a variable from a preselected magnitude is first amplified and then applied to a control member to adjust the magnitude of the variable in such sense as to remove the signal, means for stabilizing the system to minimize oscillations in the variable at the preselected magnitude, said stabilizing means comprising means deriving a direct current auxiliary voltage whose magnitude varies with the change in position of said control member, circuit means for blocking out the steady component of said auxiliary voltage, and means transmitting the variable component of said auxiliary voltage back to the input side of said amplifier in such sense as to stabilize the system.

FRANKLIN F. OFFNER.

REFERENCES CITED

The following references are of record in the file of this patent:

UNITED STATES PATENTS

| Number | Name | Date |
| --- | --- | --- |
| 2,265,290 | Knick | Dec. 9, 1941 |
| 2,420,303 | De France | May 13, 1947 |
| 2,426,181 | Deakin et al. | Aug. 26, 1947 |
| 2,448,564 | Wilkerson | Sept. 7, 1948 |